(No Model.) 3 Sheets—Sheet 1.
A. P. O'BRIEN.
COMBINED BAG HOLDER AND SCALE.
No. 570,561. Patented Nov. 3, 1896.
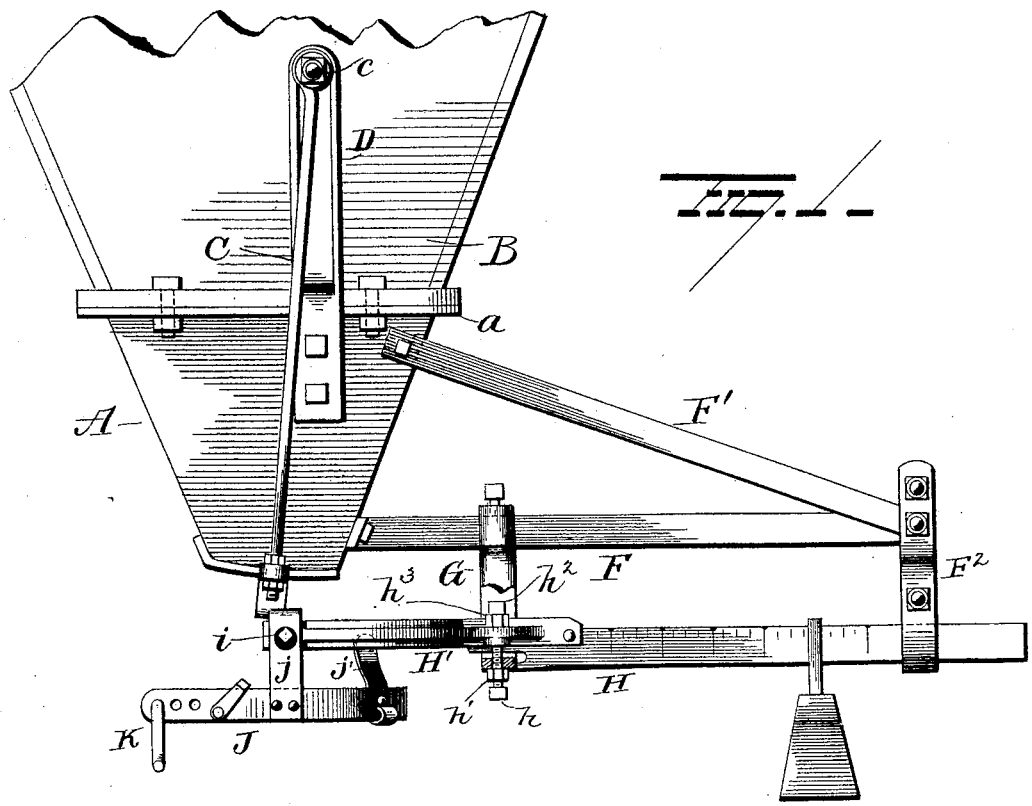
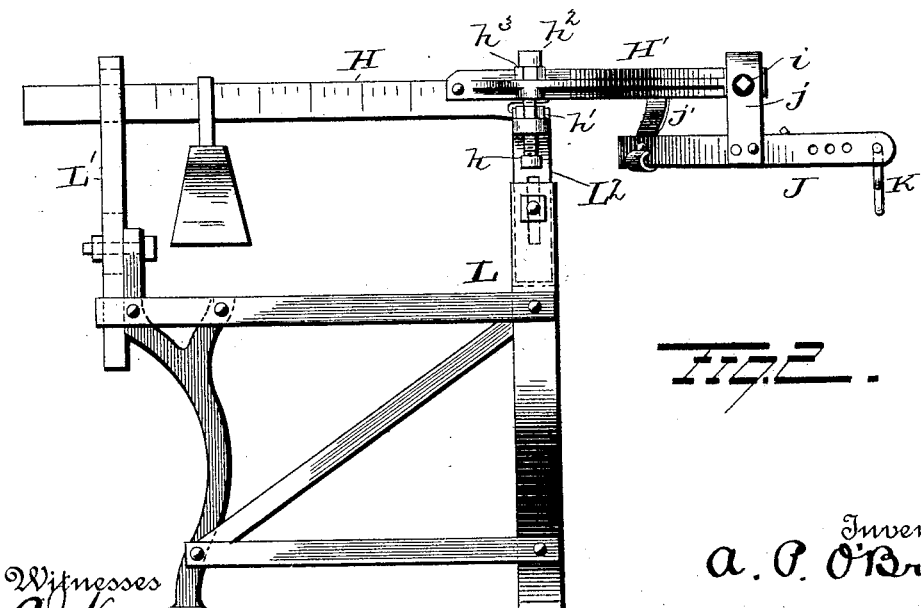
Witnesses
R. J. Nottingham
G. F. Downing
Inventor
A. P. O'Brien
By H. A. Seymour
Attorney
THE NORRIS PETERS CO., PHOTO-LITHO., WASHINGTON, D. C.

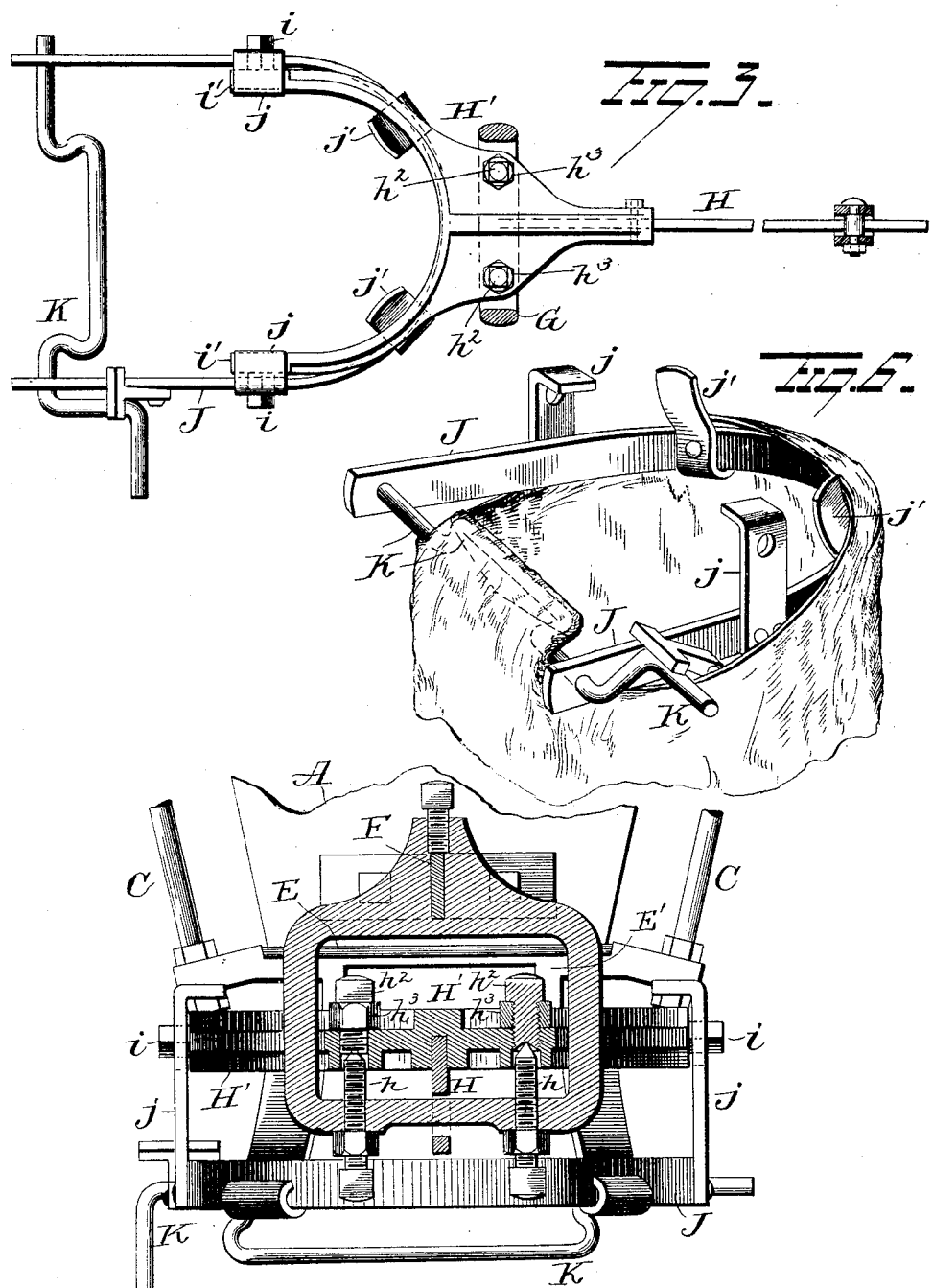

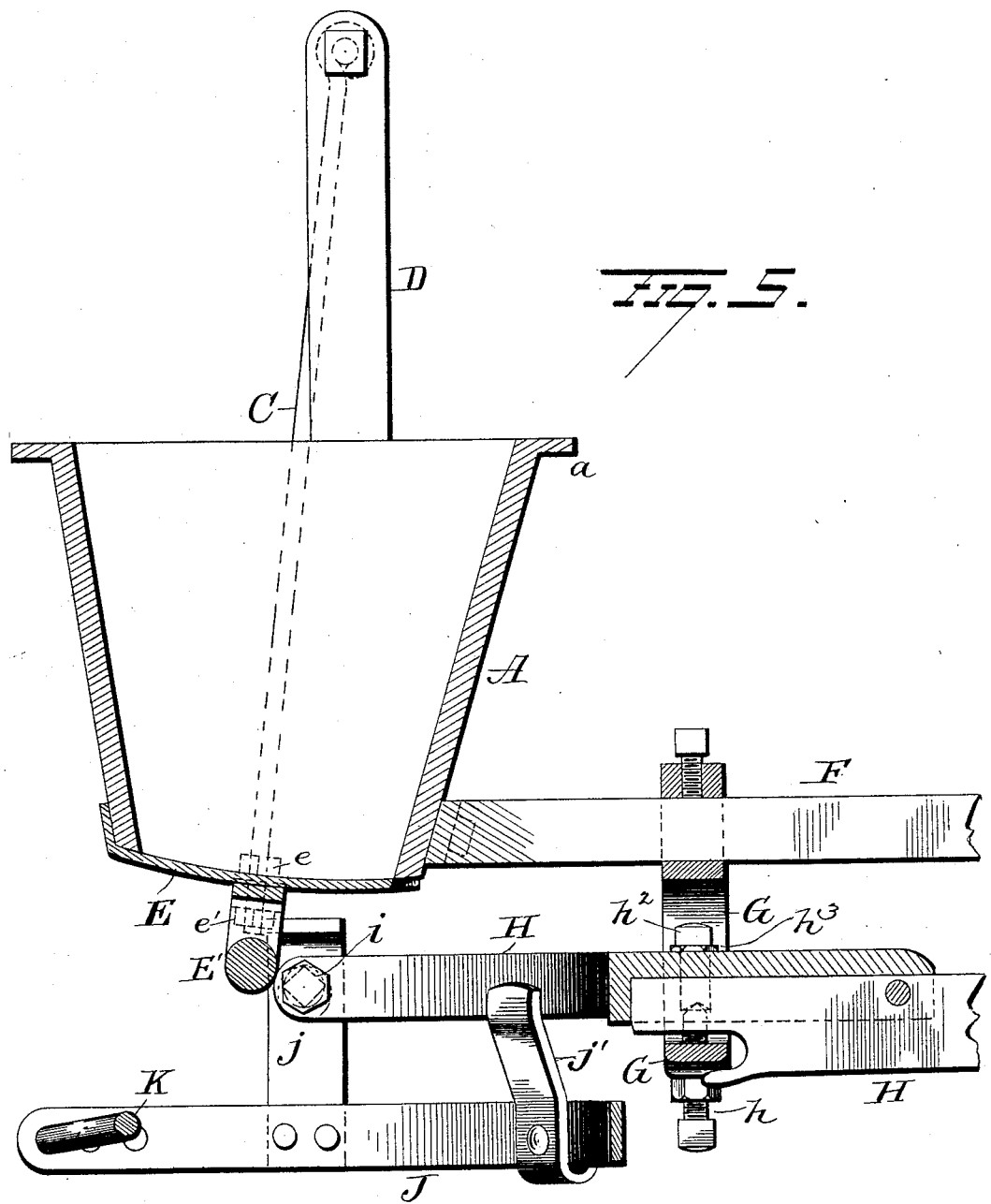

United States Patent Office.

ANDREW P. O'BRIEN, OF RICHMOND, VIRGINIA, ASSIGNOR OF ONE-HALF TO AUG. D. LEDOUX, OF SAME PLACE.

COMBINED BAG-HOLDER AND SCALE.

SPECIFICATION forming part of Letters Patent No. 570,561, dated November 3, 1896.

Application filed May 6, 1895. Serial No. 548,335. (No model.)

*To all whom it may concern:*

Be it known that I, ANDREW P. O'BRIEN, of Richmond, in the county of Henrico and State of Virginia, have invented certain new and useful Improvements in a Combined Bag-Holder and Scale; and I do hereby declare the following to be a full, clear, and exact description of the invention, such as will enable others skilled in the art to which it appertains to make and use the same.

My invention relates to an improvement in a combined bag-holder and scale, its object being to provide a comparatively simple, inexpensive, and easily-operated device that will support a bag while being filled and descend a short distance after a predetermined weight of material has been discharged into the bag, thus operating as a bag-holder and weighing device.

My invention consists in certain details in construction and combination of parts, as will be more fully described, and pointed out in the claims.

In the accompanying drawings, Figure 1 is a view in side elevation showing the device permanently attached to a hopper near the discharging end of the latter. Fig. 2 is a similar view of a portable device. Fig. 3 is a detached view of the scale-beam and bag-holder detached. Figs. 4 and 5 are views in section through one of the bearings supporting the scale; and Fig. 6 is a view of the holder, showing the manner of attaching a bag thereto.

The device shown in Fig. 1 is designed as a permanent attachment for hoppers, and consists of a metallic section or spout A, preferably tapering in form, as shown, and provided at its upper edge with a flange $a$, by which it is attached to the discharge end of a hopper B. The section A is open at its lower end, the side walls of the opening being formed in the arc of a circle concentric with the pivots $c$, to which the swinging arms C are pivoted. The pivots $c$ are mounted on the brackets D, which latter are secured at their lower ends to the spout A of the hopper and project upwardly alongside of section B. The lower ends of the arms C are screw-threaded and the cut-off gate E is secured to said screw-threaded portions by the lock-nuts $e\ e'$, placed, respectively, above and below the handle E', to which the gate is secured. The handle projects at both sides of the gate and is provided at its ends with holes for the passage of the screw-threaded ends of the arms C. By means of the screw-threaded ends of arms C and the nuts $e\ e'$ the gate can be adjusted to compensate for wear, and hence can always and under all conditions snugly fit against the lower end of spout A.

The front edge of the gate E is cut away, forming a double incline, and is slightly beveled or sharpened, so that it has a shearing or cutting action while passing through the material in cutting off the supply, and hence is not liable to become clogged, and the rear edge thereof is turned upwardly, forming a stop which limits the forward movement of the gate.

Secured to and projecting horizontally from the front face of the spout A is a bar F, the outer end of which is supported by the braces F', attached at their rear ends to the sides of the spout A near the upper end of the latter. Carried by the bar F and braces F' is the loop $F^2$, through which the front end of the scale-beam passes and which operates to prevent lateral vibration or deflection of the scale-beam and also limits the vertical play thereof.

Adjustably secured to the bar F is the yoke G. This yoke can be adjusted toward and away from the spout, so as to bring the bag squarely under the spout, and is provided on opposite sides of its center with the screws $h$, the upper ends of which are pointed, rounded, or made with knife-edges, thus forming pivotal bearing for the scale-beam. The screws $h$ are locked against accidental turning by the lock-nuts $h'$.

The scale-beam H is composed of two parts, one part of which is graduated for the weight, while the other part, which is preferably made of cast-iron, is bifurcated and supports the bag-holder. The bifurcated portion H' is provided on its under face with a groove to receive the graduated portion of the beam and the two parts are secured together by rivets. This bifurcated portion is also provided with two removable bearings $h^2$, held in place by lock-nuts $h^3$, the said bearing having concave lower ends adapted to receive the convex, pointed, or knife-edge bearings of screws $h$. By this construction there is no resting-place for any material in or around the pivotal supports of the scale-beams, and hence clogging or gumming up of the parts is avoided. The end of the graduated portion of the beam adjacent to the bifurcated portion thereof is slotted to receive the yoke G, which prevents the beam from being accidentally disengaged from its pivotal supports carried by the yoke. The bifurcated section of the beam is provided near its rear or open end with the outwardly-projecting knife-edge bearings $i$, each of which is removably locked in place by a lock-nut $i'$. Each bearing has a plurality of edges. Hence when one edge becomes worn the bearing can readily be turned, so as to present an unused edge upwardly. These bearings $i$ pivotally support the plates $j$, each of which is provided with a rounded opening for the reception of the bearings and with an inwardly-turned upper end, which latter overlaps the upper edge of the bifurcated section of the beam and limits the swinging movement of the U-shaped bag-holder J, rigidly secured to the lower ends of the plates $j$.

The bag-holder J is provided at intervals with the plates $j'$, which latter are turned over at their lower ends, forming supports for the bag, while their upper ends project upwardly above the upper edge of the holder for the purpose of holding the mouth of the bag open. The free ends of the U-shaped holder are each provided with a series of holes for the crank K. This crank is removable and can be adjusted to accommodate bags of various sizes. The mouth of the bag is placed around the holder with a portion thereof over the crank K. By now turning the crank the bag is drawn tightly around the holder, the surplus or slack being wound or wrapped around the crank. When in position for filling, the crank portion has passed the vertical center, and hence the weight of the bag and contents operate to lock the bag. To release the bag, it is simply necessary to throw the crank over toward the rear or toward the operator, when the bag, which is thus freed from the crank, is free to fall by gravity.

In the construction shown in Fig. 2 the scale-beam with its attached parts, instead of being carried by the spout or hopper, are carried by a portable stand and hence can be moved from one hopper to another. This stand L is simply a triangular stand provided at one end with a vertically-adjustable standard $L'$ for limiting the movements of the scale-beam and at its other end with a vertically-adjustable standard $L^2$, which carries the pivot-bearing for the scale-beam. In this device a lip on the upper end of standard $L^2$ enters the slot in the scale-beam and prevents the beam from accidental displacement. The construction shown in Fig. 1 is particularly designed for factories having a limited floor-space, while the construction disclosed in Fig. 2 is designed to be moved from one hopper to another.

The scales above described are not designed for indiscriminate weighing, as is the case with the ordinary scales, but are for use in factories where bags of practically the same weight are turned out for hours at a time.

While I have described a U-shaped bag-holder, such as is disclosed in my Patent No. 442,537, granted me December 9, 1890, I would have it understood that I do not confine myself to such construction, but consider myself at liberty to employ any form of holder in connection with the novel parts herein claimed.

I would also have it understood that I do not limit myself to the precise details of construction herein shown and described, but consider myself at liberty to make such changes as fairly fall within the spirit and scope of my invention.

Having fully described my invention, what I claim as new, and desire to secure by Letters Patent, is—

1. The combination with a spout, brackets projecting upwardly above the spout and arms pivoted to the brackets near the upper ends of the latter, of a gate having a V-shaped beveled front edge and a flanged rear edge, and a handle for swinging the gate, substantially as set forth.

2. In a combined bag-holder and scale the combination with a spout and a frame extending outwardly from said spout of a yoke adjustably mounted on said frame, a scale-beam supported by said yoke and a bag-holder carried by the scale-beam, substantially as set forth.

3. In a combined bag-holder and scale the combination with a support carrying bearings for the scale-beam and a loop to receive the free end of the beam, of a scale-beam having a slot adapted to receive a lip on said support and bag-holder pivotally carried by said scale-beam, substantially as set forth.

4. The combination with a scale-beam having a bifurcated end, of a U-shaped bag-holder pivotally supported by said bifurcated end, plates secured to said bag-holder and the upper ends of said plates projecting above said holder, projections located near the curved end of the holder for supporting the bag, and a crank carried by the ends of said holder for locking the bag in position, substantially as set forth.

In testimony whereof I have signed this specification in the presence of two subscribing witnesses.

ANDREW P. O'BRIEN.

Witnesses:
 GEO. W. SCHLIESER,
 DAVID HALLINAN.